J. F. Leitch,
Rake.
No. 104,042.   Patented June 7, 1870.
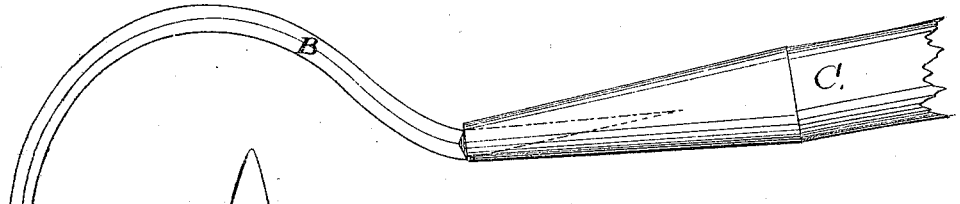
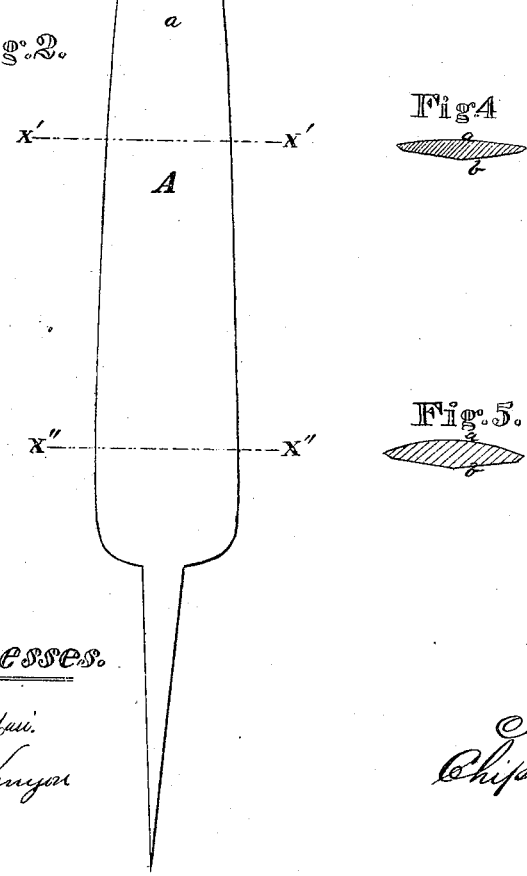
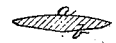
Witnesses.
Edwd. P. Mau.
Chas Kenyon
Inventor.
J. Fred. Leitch
Chipman Hosmer & Co
Attorneys

United States Patent Office.

J. FRED. LEITCH, OF OXFORD, NEW YORK.

Letters Patent No. 104,042, dated June 7, 1870.

IMPROVEMENT IN CULTIVATING-HOOK.

The Schedule referred to in these Letters Patent and making part of the same.

*To all whom it may concern:*

Be it known that I, J. FRED. LEITCH, of Oxford, in the county of Chenango and State of New York, have invented a new and valuable Improvement in Cultivating-Hooks; and I do hereby declare that the following is a full, clear, and exact description of the construction and operation of the same, reference being had to the annexed drawing making a part of this specification, and to the letters and figures of reference marked thereon.

Figure 1 of the drawing is a side view of my invention.

Figure 2 is a view of the blade before curvature.

My invention relates to an improvement in cultivating hooks, and consists in the construction thereof, whereby it is properly balanced upon the handle, furnished with cutting edges throughout the extent of the blade, and beveled from the center toward each edge in such a manner as to make its faces double convex.

The letter A of the drawing designates the blade of my hook, as it appears before curvature. Cross-sections through the dotted lines, shown at the heel, middle, and near the point, show the formation and relative proportions of the blade at these points.

B represents the hook, properly curved, and inserted into the handle C.

By referring to the figure lettered A, it is apparent that the blade of my hook is made tapering throughout, from heel to point. The cross-sections show that it also gradually diminishes in thickness from the heel to the point.

The upper surface, lettered $a$, in the drawing, is convex.

The lower side, lettered $b$, is beveled from the center toward each edge, and, when near the edge, beveled up sharply thereto, thus forming a knife-edge which can be readily sharpened, when necessary.

The curve of the hook is elliptic, as shown on the drawing. As preferred, the axes of the ellipse, of which the curve is a part, are nearly equal and oblique to the direction of the prolongation of the handle.

The effect of this conformation in the practical operation of the hook is highly satisfactory. The soil is readily turned up by the point of the blade or hook. It is so curved that, when in operation, the extreme end of the blade lies almost horizontal, and thereby the soil is cut and lifted up, instead of being merely scratched by the point.

The convex upper surface prevents the soil from clogging thereon. The knife-edge, being extended up to the heel or heavy part of the blade, is available for cutting off roots and weeds, and yet the whole is so balanced that, whether the operator be employed in cutting up a weed, loosening the soil, or raking it up about the plants, it is unnecessary to alter the distance between the hands and the hook, or that between the lower end of the handle and the ground. The handle is merely turned sufficiently to bring that portion of the hook lowermost with which it is desired to operate.

What I claim as my invention, and desire to secure by Letters Patent, is—

The elliptically curved cultivating hook herein described, so attached to its handle that the prolongation of the latter shall be oblique to the axes of the curve, provided with knife-edges, from heel to point, and having both surfaces tapering from the center toward each edge, substantially as herein shown and described.

In testimony that I claim the above I have hereunto subscribed my name in the presence of two witnesses.

J. FRED. LEITCH.

Witnesses:
E. W. ANDERSON,
D. D. KANE.